(12) United States Patent
Kroll et al.

(10) Patent No.: US 10,114,669 B2
(45) Date of Patent: *Oct. 30, 2018

(54) DYNAMIC SMT

(71) Applicant: International Business Machines Corporation, Armonk, NY (US)

(72) Inventors: Marco H. Kroll, Boeblingen (DE); Jakob C. Lang, Altdorf (DE); Angel Nunez Mencias, Stuttgart (DE); Natalie Speiser, Stuttgart (DE); Rene Trumpp, Geislingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/180,160

(22) Filed: Jun. 13, 2016

(65) Prior Publication Data

US 2017/0116031 A1    Apr. 27, 2017

Related U.S. Application Data

(63) Continuation of application No. 14/923,517, filed on Oct. 27, 2015.

(51) Int. Cl.
| G06F 9/52 | (2006.01) |
| G06F 9/48 | (2006.01) |
| G06F 11/34 | (2006.01) |
| G06F 11/30 | (2006.01) |
| G06F 9/50 | (2006.01) |
| G06F 8/30 | (2018.01) |

(52) U.S. Cl.
CPC .............. *G06F 9/48* (2013.01); *G06F 9/5027* (2013.01); *G06F 11/3024* (2013.01); *G06F 11/3409* (2013.01); *G06F 8/30* (2013.01); *G06F 2209/501* (2013.01)

(58) Field of Classification Search
None
See application file for complete search history.

(56) References Cited

U.S. PATENT DOCUMENTS

| 8,332,822 | B2 * | 12/2012 | Nagappan | G06F 11/3616 717/124 |
| 8,607,243 | B2 | 12/2013 | Kumar et al. | |
| 8,904,403 | B2 | 12/2014 | Prathiba et al. | |
| 8,935,698 | B2 | 1/2015 | Busaba et al. | |

(Continued)

OTHER PUBLICATIONS

IBM Appendix P, list of patents or patent applications treated as related, Jun. 13, 2016, 2 pages.

(Continued)

*Primary Examiner* — Lewis A Bullock, Jr.
*Assistant Examiner* — Kevin X Lu
(74) *Attorney, Agent, or Firm* — Gilbert Harmon, Jr.

(57) ABSTRACT

An approach for simultaneous multithreading in a processor. The approach comprises measuring SMT-performance value of a software code and measuring non-SMT-performance value the software code, comparing the SMT-performance value with the non-SMT performance value and dispatching the software code for execution mode by the processor based on the comparison, wherein the execution mode comprises SMT-mode and non-SMT-mode of the processor.

10 Claims, 7 Drawing Sheets

(56) References Cited

U.S. PATENT DOCUMENTS

| | | | |
|---|---|---|---|
| 9,811,444 B2* | 11/2017 | Freschl | G06F 17/30557 |
| 2004/0215939 A1 | 10/2004 | Armstrong et al. | |
| 2008/0313617 A1* | 12/2008 | Zhu | G06F 11/321 |
| | | | 717/127 |
| 2011/0161935 A1* | 6/2011 | Bellows | G06F 8/443 |
| | | | 717/127 |
| 2011/0167416 A1* | 7/2011 | Sager | G06F 8/4442 |
| | | | 717/149 |
| 2011/0213829 A1* | 9/2011 | Concini | G06F 9/547 |
| | | | 709/203 |
| 2013/0036408 A1* | 2/2013 | Auerbach | G06F 8/456 |
| | | | 717/140 |
| 2016/0179696 A1* | 6/2016 | Zmudzinski | G06F 12/1009 |
| | | | 711/163 |
| 2016/0350102 A1* | 12/2016 | Karpuram | G06F 8/654 |

OTHER PUBLICATIONS

Shin et al., "Dynamic Scheduling Issues in SMT Architectures", 0-7695-1926-1/03 (C) 2003 IEEE, pp. 1-8.
Kroll et al., "Dynamic SMT", U.S. Appl. No. 14/923,517, filed Oct. 27, 2015, 31 pages.

* cited by examiner

400

```
checkIfProgramChanged()
if changed==true
        set state = eval if state==eval
   if performanceDataForSMTEnabled == NULL
       enable SMT for program/process
       start Sampler
       start program/process
       stop Sampler
       saveData(performanceDataForSMTEnabled)
   else if performanceDataForSMTDisabled == NULL
       disable SMT for program/process
       start Sampler
       start program/process
       stop Sampler
       saveData(performanceDataForSMTDisabled)
   else
     state=getBetterState(performanceDataForSMTDisabled,
        performanceDataForSMTEnabled)
```

FIG. 4a

```
if state==on
      enable SMT for program/process
      start program/process
else if state==off
      disable SMT for program/process
      start program/process
```

| 702 | 704 | 706 | 708 | 710 | 712 |

| program | hash value | PID | Status | non-SMT | SMT |
|---|---|---|---|---|---|
| /usr/bin/ssh | c897978abd8900ef899 | 0x3345 | eval | 0x2345 | 0x32bc |
| /usr/bin/perf | f78fff78eddab2173ffb | 0x2263 | on | 0x2379 | 0x3342 |
| /usr/bin/ruby | 123ffedde7869aaacc6 | 0x8778 | on | 0x3678 | 0x7762 |
| /usr/bin/telnet | 8900bbbca776ffe443 | 0x4763 | off | 0x355b | 0x8236 |
| /usr/bin/twix | 02389ß14abbdeefb3 | 0x6216 | off | 0x326c | 0x8a76 |

FIG. 7

DYNAMIC SMT

FIELD OF THE INVENTION

The invention relates generally to simultaneous multithreading (SMT) in a processor, and more specifically, to dynamically adjusting SMT in a processor.

BACKGROUND

Simultaneous multithreading attempts to obtain higher processor utilization by allowing instructions from more than one independent thread to coexist in a processor and compete for shared resources. Shared resources can be, e.g., a joint cache for a processor having different computing cores or better sub-cores, i.e., hardware threads. The hardware threads are distinguished from software threads that may be dispatched by a dispatcher to different available hardware threads of a processor. It is known that some processes of programs run faster whereas other processes or programs run slower in an SMT environment. In some cases, two programs running in threads on the same CPU run slower than if they were serialized, i.e., run one after the other. For example, this can be the case if both programs need the same resources of a processor being available just once. Several heuristic approaches have been attempted in order to optimize software thread performance. However, all methods tried so far have their limitations.

SUMMARY

According to one embodiment of the present invention, a method for simultaneous multithreading in a processor may be provided. The method may comprise measuring SMT-performance value of a software code, wherein the software code may be executed in a simultaneous multithreading mode by the processor, and measuring non-SMT-performance value of the software code, wherein the software code may be executed in a non-simultaneous multithreading mode by the processor. Additionally, the method may comprise comparing the SMT-performance value with the non-SMT-performance value, and dispatching the software code for an execution mode by the processor depending on the comparison, wherein the execution mode may be selected out of SMT-mode and non-SMT-mode.

Moreover, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments described hereinafter and are explained with reference to the examples of embodiments, but to which the invention is not limited.

Figure 1:
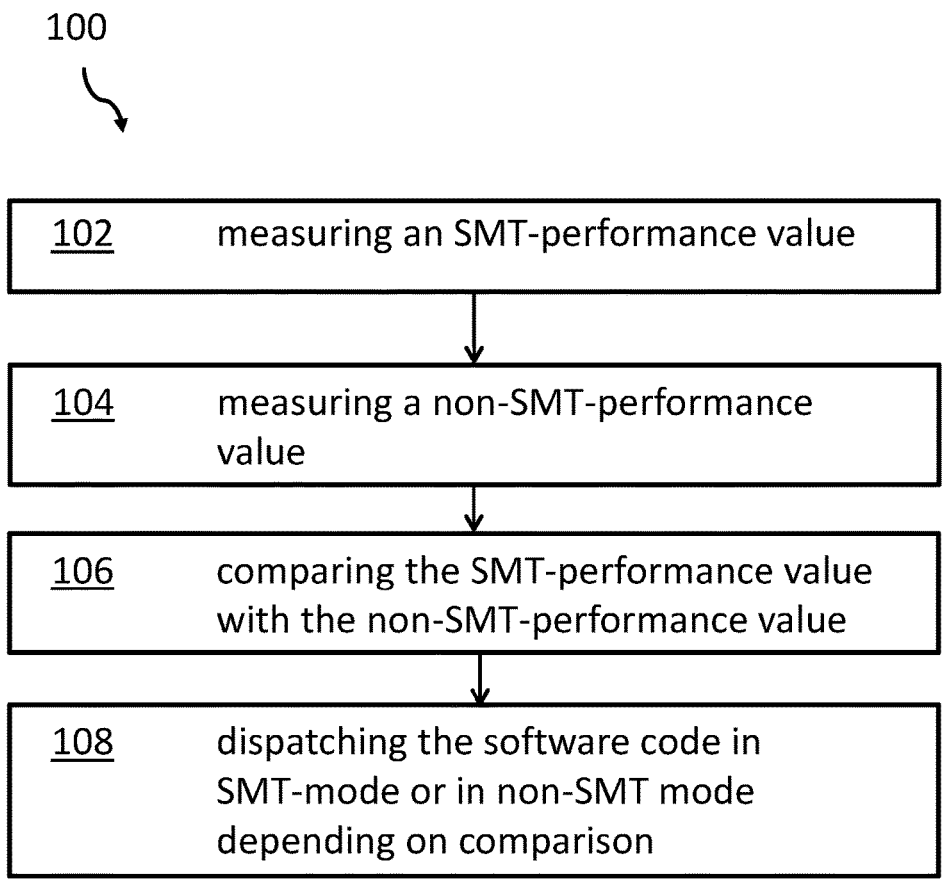
Figure 2:
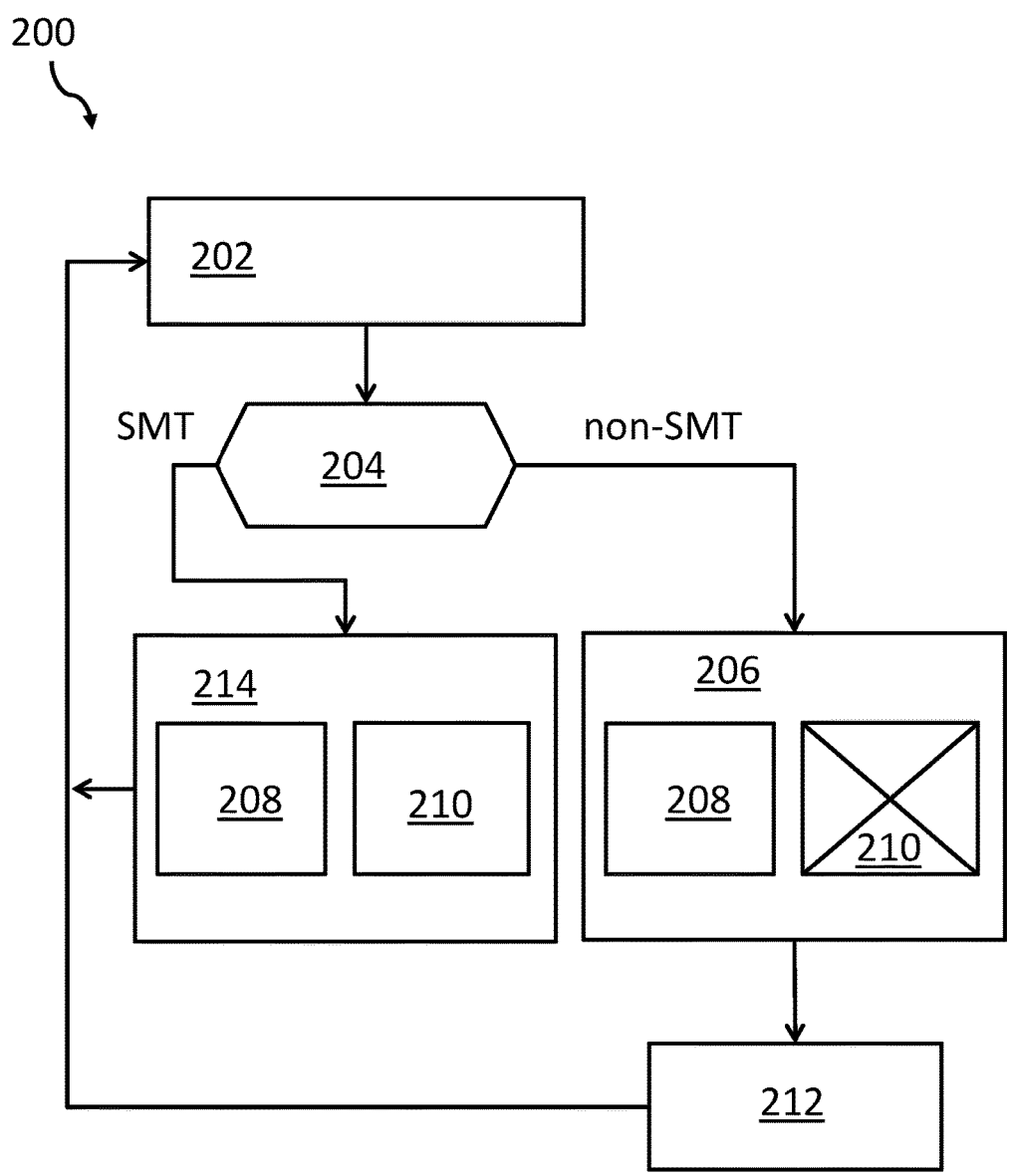
Figure 3:
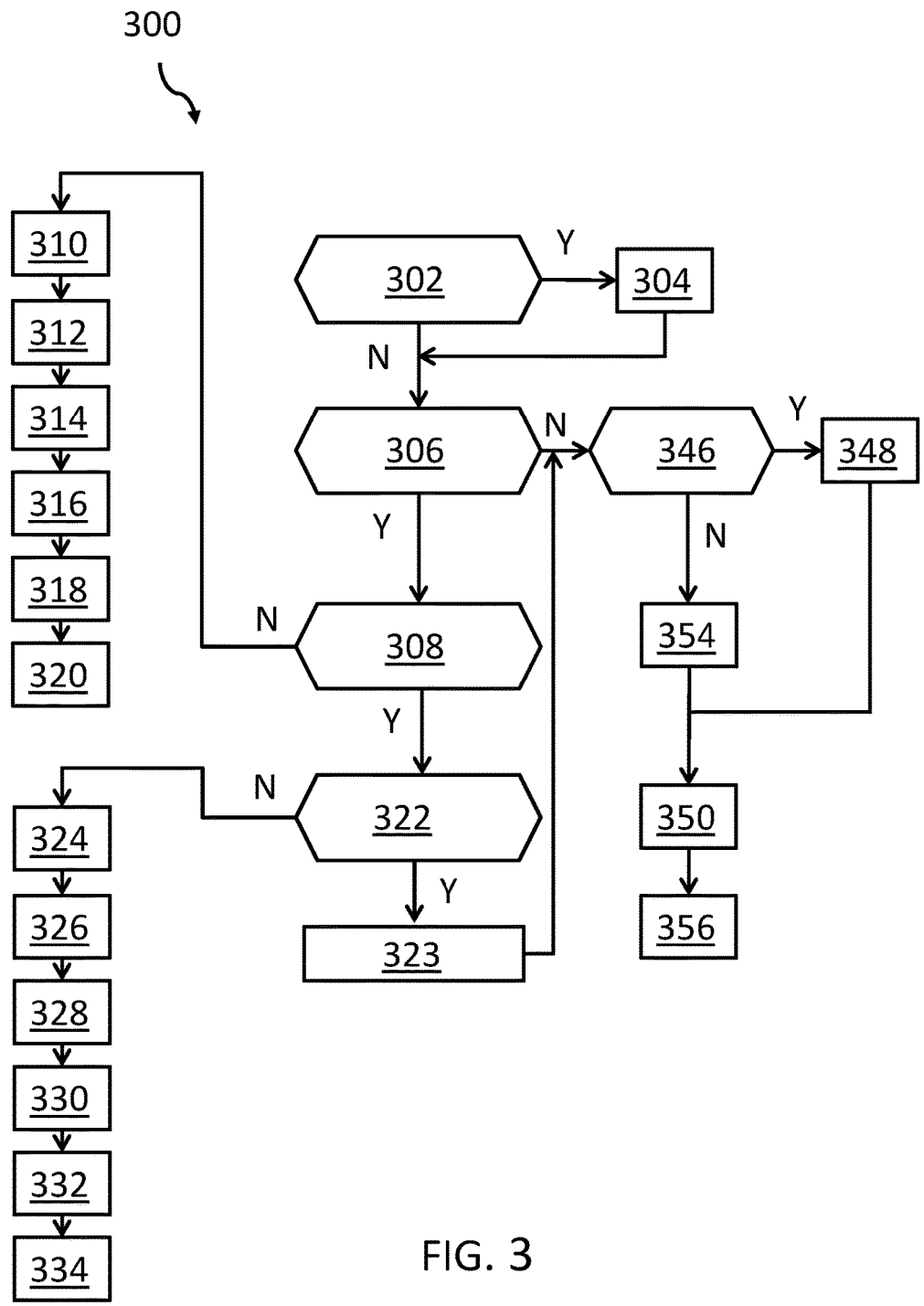
Figure 5:
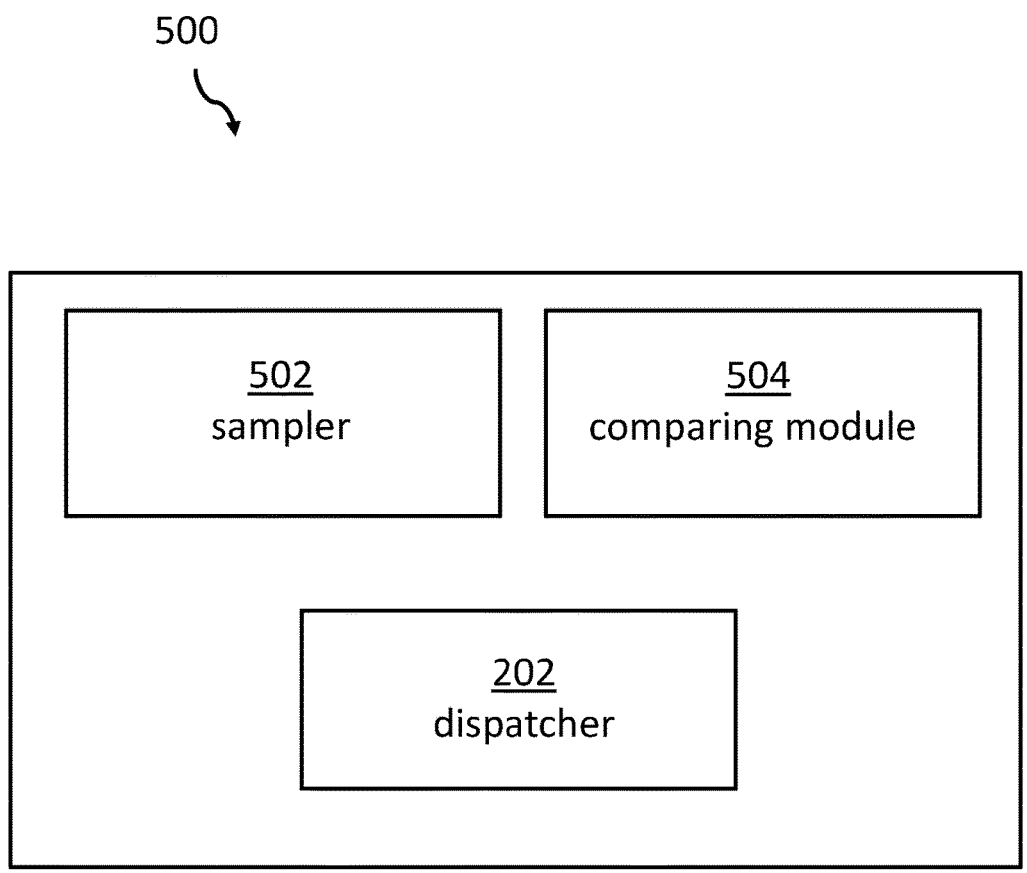
Figure 6:
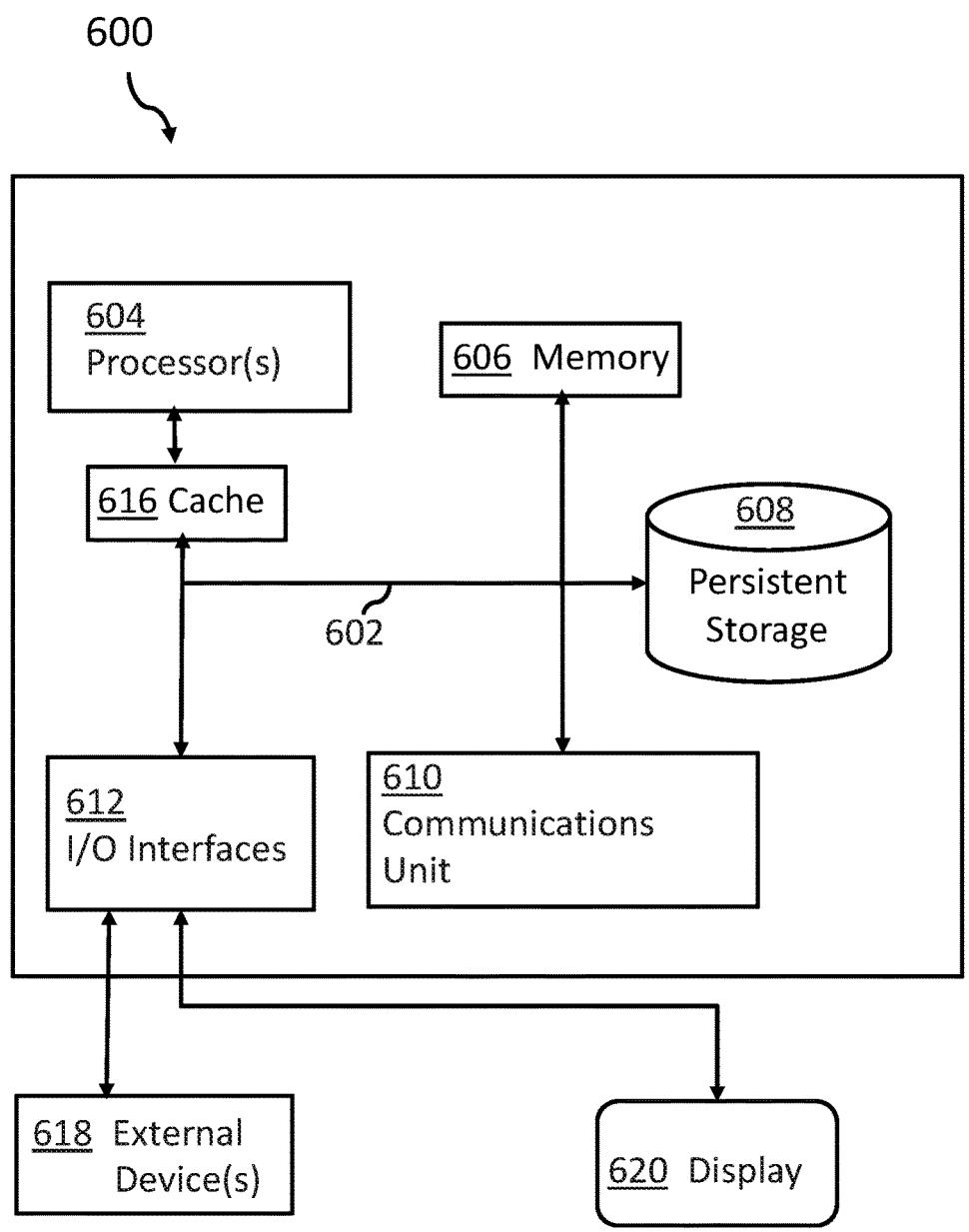

Preferred embodiments of the invention will be described, by way of example only, and with reference to the following drawings:

FIG. 1 depicts a block diagram of an embodiment of the method for simultaneous multithreading in a processor, in accordance with an embodiment of the present invention;

FIG. 2 depicts a block diagram of an embodiment of the method under a different perspective, in accordance with an embodiment of the present invention;

FIG. 3 depicts an embodiment of a detailed flow chart of the method, in accordance with an embodiment of the present invention;

FIG. 4A and FIG. 4B depict embodiments of pseudocode listings for the method, in accordance with an embodiment of the present invention;

FIG. 5 depicts an embodiment of the inventive system for simultaneous multithreading in a processor, in accordance with an embodiment of the present invention;

FIG. 6 depicts an embodiment of a computing system comprising the inventive system, in accordance with an embodiment of the present invention; and FIG. 7 depicts an embodiment of a performance table, in accordance with an embodiment of the present invention.

DETAILED DESCRIPTION

In the context of this description, the following conventions, terms and/or expressions may be used:

The term 'simultaneous multithreading' can denote a technique for improving the overall efficiency of superscalar CPUs with hardware multithreading. SMT can permit multiple independent (software) threads of execution to better utilize the resources provided by modern processor architectures. Although multithreading can be obfuscating because not only multiple threads can be executed simultaneously on one CPU core, but also multiple tasks (with different page tables, different task state segments, different protection rings, different I/O permissions, etc.). Although running on the same core, they can be completely separated from each other. Multithreading can be seen similar in concept to preemptive multitasking but can be implemented at the thread level of execution in modern superscalar processors.

A person skilled in the art will know that simultaneous multithreading is one of the two main implementations of multithreading; the other form being temporal multithreading. In temporal multithreading, only one thread of instructions can execute in any given pipeline stage at a time. In simultaneous multithreading, instructions from more than one thread can be executed in any given pipeline stage at a time. This is done without great changes to the basic processor architecture: the main additions needed are the ability to fetch instructions from multiple threads in a cycle and a larger register file to hold data from multiple threads. The number of concurrent threads can be decided by the chip designers. Two concurrent threads per CPU core are common, but some processors can support more than two concurrent threads per core.

The term 'processor' can denote a central processing unit of a computer system. Here, the processor can be enabled for SMT.

The term 'SMT-performance value' can denote a measured value of a speed of a specific software code which can be executed on a processor using SMT. Thus, different concurrent threads can be executed "in parallel" in each core of the CPU having different SMT-performance values associated.

The term 'software code' can denote any continuous stream of executable statements building a complete software program or software process or only parts thereof. Hence, a software program can be separated into different portions to which different execution modes can be assigned, e.g., SMT vs. non-SMT mode, depending on their different related performance values.

The term 'simultaneous multithreading mode' (SMT mode) can denote that software code can be executed in the SMT enabled status of a processor. Accordingly, the processor executes different threads in parallel. In contrast, a processor can also run in non-SMT mode, i.e., the processor executes only one thread at a time.

The term 'non-SMT-performance value' can denote a measured value of a speed of a specific software code which can be executed in the processor not being enabled for SMT, thus, being disabled for SMT (compare 'SMT-performance value').

The term 'performance table' can denote a logical structure for organizing and storing different variables. The performance table can have a related performance storage or memory in a persistent or non-persistent form. The performance storage can be designed to store variables and values of the performance table. An entry, e.g., a row, of the performance table can indicate a relative performance of the software code in SMT or non-SMT mode of a processor.

The term 'software version' can denote a certain release status of a software code. Typically, a newer version of a software code can have a higher version number. A newer version can also be more function-rich and can, consequently, have a different, e.g., a higher number of instructions. This can be used to differentiate different development stages of software code, e.g., by building a hash value of the software code. In case the hash value of two versions differs, then most probably the related version numbers can be different, and accordingly, the code could have been changed.

The term 'SMT-status-flag' can denote a flag in the performance table indicating how a specific software code may be executed. At least three different options may exist: the performance of the related software code can be measured, i.e., the SMT-status-flag may be set to "eval" like evaluation, the SMT-status-flag can be set to "on," indicating that SMT can be used for executing the software code and the SMT-status-flag can be set to "off," indicating the SMT cannot be used for executing the related software code.

The proposed method for simultaneous multithreading in a processor can offer a couple of advantages and technical effects. Based on the measurement of the performance of a specific software code a clear determination can be made by a dispatcher whether the specific software code should be executed in SMT or non-SMT mode by the processor. The software code can have been executed before, once or several times in SMT and non-SMT mode. Accordingly, average values of the measurements can be calculated for the different modes. During dispatching it can be decided, based on the measurement values, how to execute a certain piece of software code, either in SMT or in non-SMT mode.

A comparison of performance values in SMT or in non-SMT mode can be used for the determination. Alternatively, overwriting priorities can be used to optimize the performance of an individual software code instead of the overall performance of the processor.

Further, it is possible to overwrite the results of an evaluation whether the software code should be executed in SMT or in non-SMT mode by the processor. Thus, an operator can directly influence the way some specific software code executes and the administrator or operator can have a direct influence on the way a dispatcher works. It can therefore be possible to use a user interface to toggle a SMT/non-SMT flag in a performance table manually. Alternatively, in a case of more than two hardware threads present in a CPU, the scheduler can be instructed to limit the number of hardware threads if a specific software code can be executed.

Accordingly, dynamic dispatching methods based on an actual performance determined at runtime of a specific thread may not be required. The same applies to heuristic decision models for running the specific software code in SMT or in non-SMT mode in the processor. Consequently, related overhead can be reduced, increasing the processor performance. Using the proposed methodology, there is a solid decision basis which can be used by the dispatcher to determine which kind of execution mode should be used, SMT or non-SMT mode. This can also overcome the disadvantages of static SMT versus non-SMT modes for certain software programs.

By measuring a performance of a definable piece of software code, larger programs can be separated into dedicated software code portions which can either be executed in SMT or in non-SMT mode. This can optimize the overall performance of the software program because those parts that are SMT can run in SMT mode whereas other parts of the software program can run in non-SMT mode. If "P" denotes SMT execution mode and "S" denotes non-SMT execution mode, then a variable sequence of modes can be used for a complete software program such as, but not limited to, "SSS PPPPPP SSS PPPP S P SSS P . . . ," i.e., for different portions of the software code. This can reflect different activities of the software program. For example, user dialogue portions of a software program can easily be executed in SMT mode, whereas computationally intensive portions of the software program, such as, but not limited to, the floating-point unit, a translation look-aside buffer (TLB) or an I/O unit, can be executed in non-SMT mode.

In the following, a detailed description of the figures is provided. Instructions in the figures are schematic. Firstly, a block diagram of an embodiment of the inventive method for simultaneous multithreading in a processor is given. Further embodiments as well as embodiments of the system for simultaneous multithreading in a processor are described.

FIG. 1 depicts a block diagram of an embodiment of the inventive method 100 for simultaneous multithreading in a processor. The method comprises measuring, 102, SMT-performance value of a software code, which can be a software process or a software program, wherein the software code can be executed in a simultaneous multithreading mode by the processor. Furthermore, the method comprises measuring, 104, non-SMT-performance value of the software code, wherein the software code can be executed in a non-simultaneous multithreading mode by the processor.

Further, the method comprises comparing, 106, the SMT-performance value with the non-SMT-performance value. Further, the method comprises dispatching, 108, the software code for an execution mode by the processor based on the comparison, wherein the execution mode can be either the SMT-mode or the non-SMT-mode.

The method 100 can be well suited for a 2-hardware-thread processor. However, processors with 4 or 8 hardware threads can exist (or other numbers of hardware threads). In that case, in an alternative embodiment, it can be possible to block one or more of the available hardware threads for an execution of a software thread and release resources in or of the processor required for another thread pulling extensively on the hardware resources of the processor. This thread can have a higher priority than other threads being executed by the processor. Accordingly, in the 4 hardware thread processor one or two hardware threads can be blocked or just not filled with software threads by the scheduler, releasing resources required for the critical software thread running, e.g., on hardware thread 0. Hardware thread 1 can then be used for an executing thread that does not intensively influence the performance of the hardware thread 0. If three hardware threads are blocked or not filled by the scheduler in a 4-hardware-thread processor example, one can have the case of the non-SMT mode. In order to enable such a more sophisticated algorithm for switching hardware threads partially on and off, it can be instrumental to expand the performance table with entries of 2, 3 or 4 parallel running threads (other processors may require other entries in the performance table). It should be noted that any number of threads are suitable for the embodiments described herein. This can require more effort for measuring and assessing the performance of a software code but it can also deliver higher flexibility for performance optimization. It should be noted that an operator can still have the opportunity to overwrite the SMT-settings manually by a user interface.

According to one preferred embodiment of the method, the program code can be executed by the processor in non-SMT-mode if a difference of the non-SMT-performance and the SMT-performance differs by a predefined performance value. It can happen that the non-SMT performance of a software code can be higher than the performance in the SMT mode of the processor. The predefined performance value can be treated like a threshold value above which the dispatcher can ensure the program code can be executed in non-SMT mode of the processor.

According to one advantageous embodiment of the method, the SMT-performance value as well as the non-SMT-performance value can be determined before the dispatching. Accordingly, the measurement of the SMT-performance value in the non-SMT-performance value can be independent from the scheduling. In one aspect, the software code can be executed several times during the course of a longer time period, e.g. a day or a week, and average values can be determined for executing of the software code in either the SMT or the non-SMT mode. Thus, the dispatcher can have a clear decision basis for scheduling a specific software code in SMT or non-SMT mode.

According to one optional embodiment of the method, the SMT-performance value as well as the non-SMT-performance value can be stored in a performance table related to the software code. The dispatcher can access this performance table for a decision whether to dispatch the software code in the SMT or the non-SMT mode. Alternatively, in a case of more than two hardware threads available in a CPU, the usage of hardware threads can be limited to a predefined number if a specific software code can be executed on one of the hardware threads.

According to one additionally permissive embodiment of the method, the performance table can also comprise other values, like, e.g., a process or program identifier, a hash value of the software code, a software version, an evaluation flag, an SMT status flag, a start identifier of the measured software code, and an end identifier of the software code. Other implementations can comprise a start identifier or end identifier of the measured software code together with a length indication or an offset value relative to the beginning of the software code and a range. Accordingly, the performance table can be used as a decision basis of how to treat a certain piece of software code of a software process or software program.

The following table can indicate an embodiment of a performance table:

TABLE 1

| | |
|---|---|
| a program or process ID | The software code can be identified with this indicator. |
| a hash value | This hash value can be instrumental for ensuring that the software code has not been changed after determining the performance values. |
| Status | This status can indicate in which mode the software code should be run: in SMT mode in non-SMT mode or in an evaluation mode for acquiring performance values. |
| SMT-performance value | This variable can indicate the SMT-performance of the software code. |
| non-SMT performance value | This variable can indicate the non SMT-performance of the software code. |

According to one additional embodiment of the method, the processor can be enabled for executing at least two parallel threads. It should be noted, that these two parallel threads can be seen as hardware threads or, in other words, 'sub-cores' which, e.g., share the same processor cache and/or floating-point unit, processor internal bus capacities or other critical resources.

According to one additionally advantageous embodiment of the method, a processor can be blocked for SMT, a second or additional hardware thread can be blocked for execution, if the software code is dispatched for an execution in non-SMT-mode. This can require a special setting of the processor which can be enabled by the dispatcher. Alternatively, the schedule can leave the other hardware thread empty for the execution time of the software code running in non-SMT mode.

According to one preferred embodiment of the method, the SMT-performance value as well as the non-SMT-performance value can each be based on a measurement of different parameters. These parameters can comprise a total number of clock cycles required for executing the software code, a time period used for running the program code, a time period required for a predefined portion of the software code, an instruction counter value, an input/output access number value, an accumulated input/output time value, a memory access number value, an accumulated memory access number, and/or a number of cache misses. Alternatively, combinations of above-mentioned value can be used for a performance determination. Thus, a fine-grained and detailed basis for SMT versus non-SMT mode decision can be available for the schedule.

According to one additionally preferred embodiment of the method, the method can also comprise determining a version or an actual hash value of the software code before, or directly before, a dispatching. The version number or the hash value can be seen as a software code characteristic. This version or actual hash value can be compared to a version or a hash value determined during determining a performance value, i.e. SMT performance value or non-SMT performance value. A comparison of the two versions or hash values can indicate whether the software code has been changed between the measurement of the performance values and the actual execution which can be prepared by the dispatcher. If the versions or hash values are determined to be different then the performance values in the performance table can be useless for an actual decision of the dispatcher with regard to dispatching in SMT mode or non-SMT mode.

According to one further embodiment of the method, the software code can be a portion of a software program. Thus, different portions of the software program can be executed in different modes, i.e., either SMT or non-SMT mode. This can reflect that different portions of the program can require different resources of a processor. For example, a user dialogue oriented portion of a program can easily be executed in SMT mode, whereas computer intensive portions of a software program would be better executed in non-SMT mode of the processor because, e.g., an intensive usage of the processor-internal cache is made or a floating-point unit can be accessed comparably intensively.

FIG. 2 shows a block diagram 200 of an embodiment of the method 100 under a different perspective. A standard dispatcher 202 can determine in an additional determination unit 204 whether a certain software code can be executed in SMT or non-SMT mode. If a decision is made for SMT mode the processor 214 can run two parallel threads 208, 210 and after execution can hand back the control to the dispatcher 202. In case the determination unit 204 decides for non-SMT mode, the hardware thread 210 of the processor 206 can be blocked for execution such that only the hardware thread 208 can be used for an execution of the software thread to be executed in non-SMT mode. The dispatcher can actively disable a second, or more hardware threads in the CPU 206, if non-SMT mode is required. However, an alternative solution can be in simply not using this second hardware thread 210 of the CPU 206. After the software code has been executed on the hardware thread 208, the blocked threads, here hardware thread 210, can be released, 212, and the control can be given back to the schedule for scheduling the next software code portion(s) for execution by the processor or hardware threads. It can be noted that FIG. 2 used device-type elements and activities in a mixture. It can also be noted that two processors are shown in FIG. 2. One skilled in the art will understand that only one processor 206 or 214 can be required to execute the proposed method. The processors are shown to differentiate between the different modes: SMT vs. non-SMT.

FIG. 3 shows an embodiment of a more detailed flow chart 300 of the method 100. The dispatcher 202 or a dedicated module can first determine, 302, whether the software code has changed compared to a time when the performance values were determined. This can be performed by comparing hash values or simply version numbers of the software code at different points in time. If the hash values are different, case of "yes," the status in the performance table can be set to "eval", 304, indicating, that during the next execution of the software code, the performance can be evaluated or measured. If during a subsequent determination it is determined, 306, that the status has been set to "eval" it can be determined, 308, whether performance data with enabled SMT is available. In case of "no", SMT is enabled, 310, for the software code, a sampler is started, 312, in order to determine one or more performance values (compare above), the software code is started, 314, and executed to an end point. Then the sampler can be stopped, 316, the performance data are saved, 318, in the performance table, and the just described subroutine can return, 320, the process flow back to the main routine.

If, during the determination 308, it is determined, that performance data with enabled SMT are available, a next determination 322 can be performed to evaluate whether performance data with this a bit SMT, non-SMTP mode, can be available. In case of "no," the comparable sequence can be activated: SMT is disabled, 324, for the software code, a sampler is started, 326, in order to determine one or more performance values (compare above), the software code is started, 328, and executed. Then the sampler has stopped, 330, the performance data are saved, 332, in the performance table, and the just described subroutine can return, 334, the process flow back to the main routine.

If, during the last determination 322, it is found that performance data with disabled SMT are available, which would automatically mean that also performance data with enabled SMT are available, execution can be continued by a setting of the status, 323, for the software code. If, for example, a difference between a performance value in non-SMT mode is bigger than in SMT mode, i.e., non-SMT performance value minus SMT-performance value is greater than Zero, then the status is set to "on," in block 323, indicating that SMT mode should be enabled. In the alternative case (smaller or equal Zero) the status can be set, 323, to "off," indicating the SMT mode can be disabled.

Next, the procedure continues with a determination 346 whether the status is set to "on." In the case of "yes," the SMT mode can be enabled, 348, for the software code and the program can be started, 350. In case of "no," during the determination 346, it is clear that the status is set to "off." In this regard, the SMT mode can be disabled, 354, the program can be started, 350, before this subroutine exits, 356.

FIG. 4a and FIG. 4b show embodiments of pseudocode listing 400, 402 for the method 100. Basically, this pseudocode shows the behavior of the system as explained in the context of FIG. 3. It should be noted that the statement "if state==on" in FIG. 4b corresponds to the determination box 346. Similarly, the statement "else if state==off" can make clear that the status is "off" and the SMT mode can be disabled, 354. One skilled in the art will be able to relate the flowchart of FIG. 3 to the pseudocode listings 400 and 402.

FIG. 5 shows an embodiment of the inventive system 500 for simultaneous multithreading in a processor 206 or 214. This can again show the system 500 from a different perspective and can relate to components already described. The system 500 can comprise a sampler 502 adapted for measuring SMT-performance value of a software code, wherein the software code is executed in a simultaneous multithreading mode by the processor 206 or 214. Additionally, the sampler 502 can also be adapted for measuring non-SMT-performance value of the software code, wherein the software code can be executed in a non-simultaneous multithreading mode by the processor 206 or 214.

A comparing module 504 can be adapted for comparing the SMT-performance value with the non-SMT-performance value. A dispatcher 202 can be adapted for dispatching the software code to be executed either in SMT mode or in non-SMT mode by the processor 206 or 214 depending on the comparison. Alternatively, in case of more than two hardware threads are available in the CPU, it can be decided not to use all available hardware threads, i.e., limit the parallel use of the hardware threads depending on the metadata for a specific software code.

For illustrative purposes, an example of a performance table 700 is shown in FIG. 7. This performance table can be used by an operating system being executed on the computer system (compare FIG. 6). It should be noted that the performance table is not linked to any specific type of operating system, i.e., the proposed method and the related system can be implemented with any operating system.

The performance table 700 shows various columns indicating some of the values discussed above: a software code identification 702, a hash value 704, a process ID, also PID, 706, a status 708, a relative performance value number with SMT disabled 710 (SMT disabled), and a relative performance number with SMT enabled 712.

Embodiments of the invention can be implemented together with virtually any type of computer, regardless of the platform being suitable for storing and/or executing program code as long as are components according to the following figure are present. FIG. 6 shows, as an example, a computing system 600 suitable for executing program code related to the proposed method.

FIG. 6 depicts computer system 600, an example computer system representative of a system for simultaneous multithreading 500. Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

Additionally, the system for simultaneous multithreading 500 in a processor 206 or 214 can be attached to the bus system 602. It should be noted that the processor 206 or 214 of FIG. 2 can be equivalent to the processor 604 shown in FIG. 6.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for simultaneous multithreading in a processor, the method comprising:

measuring SMT-performance value of a software code, wherein the software code is executed in a simultaneous multithreading mode by the processor;

measuring non-SMT-performance value of the software code, wherein the software code is executed in a non-simultaneous multithreading mode by the processor;

comparing the SMT-performance value with the non-SMT-performance value and validating performance values, in a performance table, based on comparing a version of the software code with a version stored in the performance table with regard to the use of performance values in a decision to dispatch in SMT mode or non-SMT mode; and dispatching the software code for an execution mode by the processor, depending on the comparison, wherein the execution mode is at least one of SMT-mode or non-SMT-mode, and wherein different portions of the software code can be executed in different execution modes based on resource requirements of the different portions.

2. The method of claim 1, wherein the software code is executed by the processor in non-SMT-mode if a difference of the non-SMT-performance and the SMT-performance differs by at least a predefined performance value.

3. The method of claim 1, wherein the SMT-performance value and the non-SMT-performance value are determined before the dispatching.

4. The method of claim 1, wherein the SMT-performance value and the non-SMT-performance value are stored in a performance table.

5. The method of claim 4, wherein the performance table further comprises a first one or more software code characteristics of at least one of a process identifier, a program identifier, a hash value of the software code, a software version, an evaluation flag, a SMT-status-flag, a start identifier of the measured software code, and an end identifier of the software code.

6. The method of claim 5, further comprising:

determining a second software code characteristic of the software code before dispatching; and responsive to, determining the second software code characteristic is different than at least one of the first one or more software code characteristics stored in the performance table, setting the evaluation flag.

7. The method of claim 1, wherein the processor is enabled for executing at least two parallel threads.

8. The method of claim 1, wherein, if the software code is dispatched for an execution in non-SMT-mode, blocking any other thread for the processor, apart from the thread of the software code.

9. The method of claim 1, wherein the SMT-performance value and the non-SMT-performance value is based on a measurement of a value selected from the group comprising a total number of clock cycles required for executing the software code, a time period used for running the software code, a time period required for a predefined portion of the software code, an instruction counter value, an input/output access number value, an accumulated input/output time value, a memory access number value, an accumulated memory access number and a number of cache misses.

10. The method of claim 1, wherein the software code is a portion of a software program.

\* \* \* \* \*